US011051628B2

(12) United States Patent
Yang (10) Patent No.: US 11,051,628 B2
(45) Date of Patent: Jul. 6, 2021

(54) DISASSEMBLE BED FRAME

(71) Applicant: Lei Yang, City of Industry, CA (US)

(72) Inventor: Lei Yang, City of Industry, CA (US)

(73) Assignee: Furniture of America. Inc., City of Industry, CA (US)

( * ) Notice: Subject to any disclaimer, the term of this patent is extended or adjusted under 35 U.S.C. 154(b) by 12 days.

(21) Appl. No.: 16/377,251

(22) Filed: Apr. 8, 2019

(65) Prior Publication Data

US 2020/0315360 A1  Oct. 8, 2020

(51) Int. Cl.
*A47C 19/00* (2006.01)
*F16B 12/56* (2006.01)
*A47C 19/02* (2006.01)

(52) U.S. Cl.
CPC .......... *A47C 19/005* (2013.01); *A47C 19/027* (2013.01); *F16B 12/56* (2013.01)

(58) Field of Classification Search
CPC ....... A47C 19/00; A47C 19/005; A47C 19/02; A47C 19/021; A47C 19/022; A47C 19/024; A47C 19/025; A47C 19/027; A47C 19/028; A47C 19/04
See application file for complete search history.

(56) References Cited

U.S. PATENT DOCUMENTS

| | | | | |
|---|---|---|---|---|
| 2,550,426 A * | 4/1951 | Phillips | ................ | A47C 19/028 5/8 |
| 2,745,117 A * | 5/1956 | Sands | ................... | A47C 19/021 5/200.1 |
| 5,894,614 A * | 4/1999 | Stroud | ................. | A47B 91/028 5/200.1 |
| 6,209,155 B1 * | 4/2001 | Epstein | ................ | A47C 19/025 5/181 |
| 6,832,397 B2 * | 12/2004 | Gaboury | .............. | A47C 19/005 5/201 |
| 7,690,058 B1 * | 4/2010 | Dwyer | ................. | A47C 19/005 5/310 |
| 2004/0093670 A1 * | 5/2004 | Polevoy | ............... | A47C 19/025 5/200.1 |
| 2012/0137430 A1 * | 6/2012 | Geiger | ................... | A47C 19/02 5/201 |
| 2014/0245534 A1 * | 9/2014 | Anderson | ........... | A47C 19/022 5/9.1 |
| 2017/0208955 A1 * | 7/2017 | Lee | ......................... | F16B 12/58 |
| 2018/0125255 A1 * | 5/2018 | Jin | ....................... | A47C 19/122 |

* cited by examiner

*Primary Examiner* — Nicholas F Polito
*Assistant Examiner* — George Sun
(74) *Attorney, Agent, or Firm* — Raymond Y. Chan; David and Raymond Patent Firm (57) ABSTRACT

A disassemble bed frame includes two longitudinal supporting arms, a plurality of bed slats, and a plurality of clearance lockers. Each of the supporting arms has a plurality of engaging slots spacedly formed at an inner side thereof, such that the engaging slots along the supporting arms are aligned when the supporting arms are extended parallelly. Two end portions of each of the bed slats are received at two of the engaging slots of said supporting arms respectively, such that the bed slats are spacedly extended between the supporting arms. The clearance lockers are detachably coupled at the supporting arms and are biased against the end portions of the bed slats to minimize clearances of the end portions of the bed slats within the engaging slots and to prevent the bed slats being detached from the supporting arms.

12 Claims, 4 Drawing Sheets

DISASSEMBLE BED FRAME

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a bed frame, and more particularly to a disassembled bed frame, which provides a reinforcing structure that not only supports the bed frame when it is assembled but also allows the bed frame being repeatedly assembled-disassembled without affecting its rigid structure.

Description of Related Arts

A conventional bed frame generally comprises two longitudinal arms and a plurality of bed slats spacedly extended between the longitudinal arms to provide a sturdy support of the bed frame. However, the rigid structure of the bed frame cannot be folded into a compact unit, such that the bed frame will occupy a relatively larger space for transportation and storage, especially for the manufacturer and the end user.

An improved bed frame provides a foldable structure in order to enable the bed frame to fold into a compact unit. Accordingly, the bed frame further comprises two pivot joints provided at the longitudinal arms respectively, such that the bed frame can be folded in half via the pivot joints to reduce the storage and package space. The foldable structure allows the bed frame to quickly and easy setup without requiring any tool. The folded bed frame can only reduce the unfolded bed frame in half, such that the folded bed frame cannot reduce much transportation and storage space. In addition, the major drawback of the foldable structure is that the structure of the longitudinal arm will be weakened by the foldable joint. In other words, the loading force at the bed frame will be substantially reduced. In order to enhance the strength of the bed frame, the longitudinal arms must be made of high quality material with an enhanced durability. However, the overall weight of the bed frame and the manufacturing cost of the bed frame will be highly increased.

Another improved bed frame provides an assembling structure in order to enable the bed frame to be assembled into the bed frame from a compact unit. The bed frame further comprises a plurality of assembling joints provided at connections between the longitudinal arms and the bed slats, such that the longitudinal arms and the bed slats are packed individually to save the transportation and storage space. The longitudinal arms and the bed slats are assembled together to form the bed frame. It is worth mentioning that the assembling joint will create a clearance between two connecting components, i.e. the longitudinal arm and the bed slat, in order to enable the assembling operation of the connecting components. Likewise, via the clearance at the assembling joint, the assembling joint will weaken the strength of the bed frame to reduce the loading force thereat. In addition, the connections of the bed frame will be loosened when the assembling joints are repeatedly actuated. Therefore, the assembling joints will only be used for initially set up the bed frame and the bed frame will never be disassembled thereafter.

The common problem of the above mentioned bed frames is that they are not expandable. The bed frame is initially designed and configured in a particular size, such as full size, queen size or king size. Therefore, the user will need to purchase a new bed frame in order to change the size of the original bed frame.

SUMMARY OF THE PRESENT INVENTION

The invention is advantageous in that it provides a disassemble bed frame, which provides a reinforcing structure that not only supports the bed frame when it is assembled but also allows the bed frame being repeatedly assembled-disassembled without affecting its rigid structure.

Another advantage of the invention is to a disassemble bed frame, which comprises a plurality of clearance lockers for minimizing clearances of end portions of the bed slats within the engaging slots at the supporting arms so as to prevent the bed slats being detached from the supporting arms.

Another advantage of the invention is to a disassemble bed frame, wherein the clearance lockers allow the bed slats disassembled and re-assembled to the supporting arms without damaging the connection structure therebetween.

Another advantage of the invention is to a disassemble bed frame, wherein the clearance lockers ensure the loading force at the bed frame to be evenly and efficiently distributed thereto by minimizing the clearances between the bed slats and the supporting arms.

Another advantage of the invention is to a disassemble bed frame, wherein the clearance lockers allow the bed frame being disassembled for easily transported and storage.

Another advantage of the invention is to a disassemble bed frame, wherein the assembling operation of the bed frame is simply and easy by coupling the bed slats at the engaging slots of the supporting arms and by coupling the clearance lockers at the supporting arm to minimize the clearances the bed slats at the engaging slots.

Another advantage of the invention is to a disassemble bed frame, wherein the bed frame is constructed in a modularized manner that the bed frame is expansible by the connecting the bed frame modules with each other.

Another advantage of the invention is to a disassemble bed frame, which comprises a module locker not only locks up the bed frame modules with each other but also enhance the support ability of the bed frame.

Another advantage of the invention is to a disassemble bed frame, wherein the configuration of the bed frame module can be incorporated with other furniture frames, such that the bed frame module not only serves as a basic bed structure but also used as different furniture frames such as a sofa frame.

Another object of the present invention is to provide a disassemble bed frame, wherein no expensive or complicated structure is required to employ in the present invention in order to achieve the above mentioned objects. Therefore, the present invention successfully provides an economic and efficient solution for providing a rigid structure of the bed frame being able to be repeatedly disassembled and re-assembled.

Additional advantages and features of the invention will become apparent from the description which follows, and may be realized by means of the instrumentalities and combinations particular point out in the appended claims.

According to the present invention, the foregoing and other objects and advantages are attained by a disassemble bed frame comprises two longitudinal supporting arms, a plurality of bed slats, and a plurality of clearance lockers.

Each of the supporting arms has a plurality of engaging slots spacedly formed at an inner side thereof, such that the engaging slots along the supporting arms are aligned when the supporting arms are extended parallelly.

Two end portions of each of the bed slats are received at two of the engaging slots of the supporting arms respectively, such that the bed slats are spacedly extended between the supporting arms.

The clearance lockers are detachably coupled at the supporting arms and are biased against the end portions of the bed slats to minimize clearances between the end portions of the bed slats and the engaging slots and to prevent the bed slats being detached from the supporting arms.

In accordance with another aspect of the invention, the present invention comprises an assembling method of the disassemble bed frame, which comprises the following steps.

(A) Spacedly couple a plurality of bed slats between two longitudinal supporting arms by receiving two end portions of each of the bed slats at two engaging slots at the supporting arms respectively.

(B) Detachably couple a plurality of clearance lockers at the supporting arms to form a bed frame module, wherein the clearance lockers are arranged to bias against the end portions of the bed slats to minimize clearances between the end portions of the bed slats and the engaging slots and to prevent the bed slats being detached from the supporting arms.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
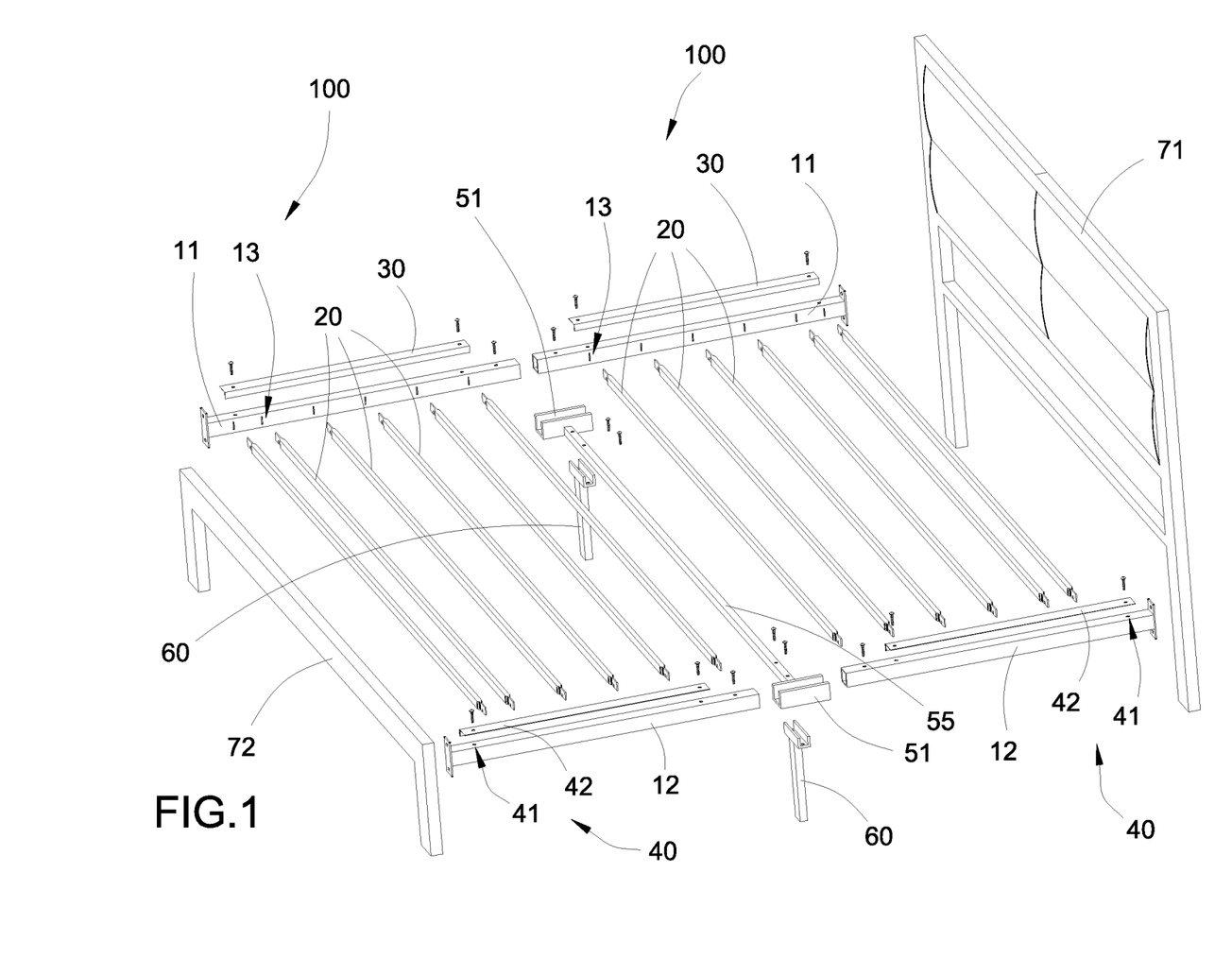
FIG. 1 is an exploded perspective view of a disassemble bed frame according to a preferred embodiment of the present invention.

Referring to FIG. 1 of the drawings, a disassemble bed frame according to a preferred embodiment of the present invention is illustrated, wherein the disassemble be frame comprises one or more bed frame modules 100. Each of the bed frame modules 100 comprises two longitudinal supporting arms 11, 12, a plurality of bed slats 20, and a plurality of clearance lockers 30.

The two supporting arms 11, 12, which is the first and second supporting arms, serves as left and right supporting arms or front and back supporting arms. In other words, the supporting arms 11, 12 are extended in a parallel manner. In one embodiment, each of the supporting arms 11, 12 has a hollow structure. Preferably, each of the supporting arms 11, 12 has rectangular cross section and defines a top side and an inner side.

Figure 2:
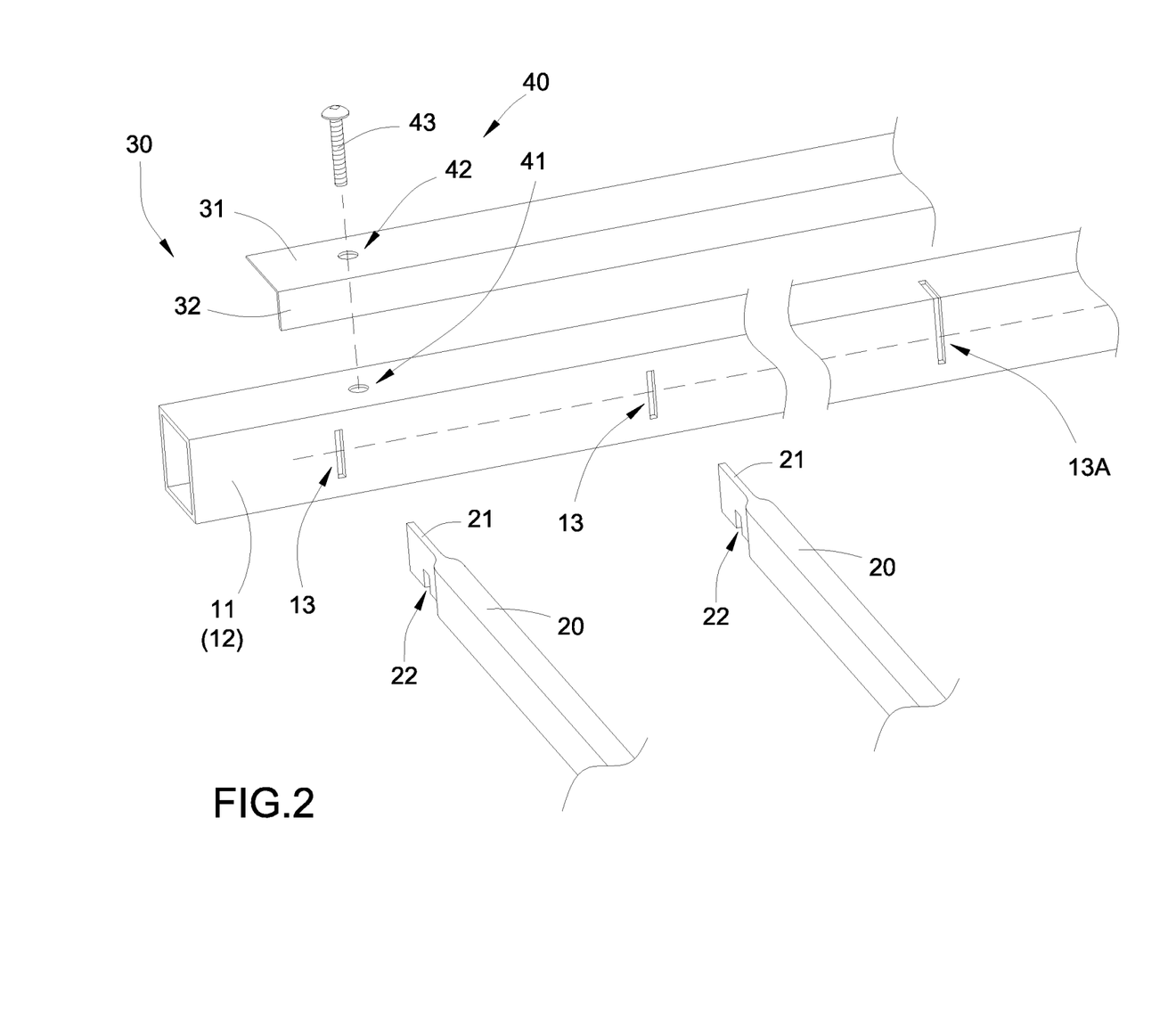
FIG. 2 is a partially perspective view of the disassemble bed frame according to the preferred embodiment of the present invention, illustrating the connection among the supporting arm, the bed slat, and the clearance locker.
Figure 3:
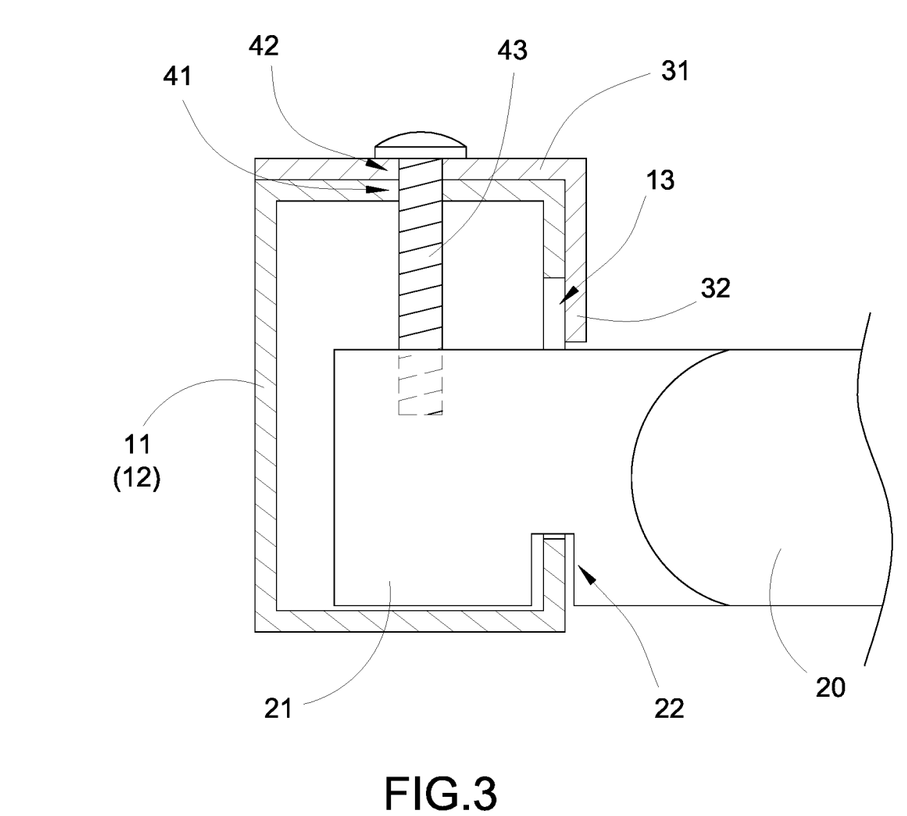
FIG. 3 is a partially sectional view of the of the disassemble bed frame according to the preferred embodiment of the present invention, illustrating the connection among the supporting arm, the bed slat, and the clearance locker.

As shown in FIGS. 2 and 3, each of supporting arms 11, 12, has a plurality of engaging slots 13 spacedly formed at the inner side thereof, wherein the engaging slots 13 along the supporting arms 11, 12 are aligned when the supporting arms 11, 12 are extended parallelly.

Two end portions 21 of each of the bed slats 20 are received at two of the engaging slots 13 of the supporting arms 11, 12 respectively, such that the bed slats 20 are spacedly extended between the supporting arms 11, 12.

The clearance lockers 30 are detachably coupled at the supporting arms 11, 12 and are biased against the end portions 21 of the bed slats 20 to minimize clearances between the end portions 21 of the bed slats 20 and the engaging slots 13 and to prevent the bed slats 20 being detached from the supporting arms 11, 12.

According to the preferred embodiment, each of the engaging slots 13 has an elongated configuration. In one embodiment, the engaging slots 13 are vertically, parallelly and spacedly formed at the inner side of each of the supporting arms 11, 12. Preferably, a length of each of the engaging slots 13 is smaller than a height of each of the supporting arms 11, 12. In other words, each of the engaging slots 13 is formed at the inner side of the supporting arm 11, 12 between the top and bottom sides thereof.

It is appreciated that the shape of the engaging slot 13A can be altered as shown in FIG. 3, wherein the engaging slot 13A is formed at the inner side of the supporting arm 11, 12 and is further extended to the top side of the supporting arm 11, 12, such that the engaging slot 13A is formed at a L-shaped configuration. The end portion 21 of the bed slat 20 can be easily engaged with the L-shaped engaging slot 13A from the top side of the supporting arm 11, 12 to the inner side thereof.

Correspondingly, the end portion 21 of each of the bed slats 20 is flatten to slidably insert into the engaging slot 13. The end portion 21 of the bed slat 20 is flatten to form a vertical flattened end so as to insert into the vertical engaging slot 13. In other words, a thickness of the end portion 21 of the bed slat 20 is slightly smaller than a width of the engaging slot 13.

As shown in FIGS. 2 and 3, each of the bed slats 20 further has an interlocking slot 22 upwardly extended from a bottom edge of the end portion 21 of the bed slat 20 to interlock with a bottom edge of the engaging slot 13. Accordingly, the interlocking slot 22 is a vertical slot defining an opening at the bottom edge of the end portion 21 of the bed slat 20, wherein when the end portion 21 of the bed slat 20 is slidably inserted into the engaging slot 13, the bed slat 20 is slid downwardly to engage the interlocking slot 22 with the bottom edge of the engaging slot 13 so as to interlock the bed slat 20 with the supporting arm 11, 12.

According to the preferred embodiment, each of the clearance lockers 30 has a biasing portion downwardly pressed on the end portion 21 of the bed slat 20 to tighten the end portion 21 of the bed slat 20 at the engaging slot 13. Once the clearance locker 30 is coupled at the supporting arm 11, 12, the clearance will be minimized to prevent the movement of the end portion 21 of the bed slat 20 being detached from the engaging slot 13. In other words, before coupling the clearance locker 30, the clearance of the engaging slot 13 enables the end portion 21 of the bed slat 20 being moved to engage with the engaging slot 13. Preferably, once the clearance is minimized, the end portion 21 of the bed slat 20 cannot be moved at the engaging slot 13, such that bed slat 20 will be securely extended from the supporting arm 11, 12 to evenly distribute the loading force between the supporting arms 11, 12 and the bed slats 20.

As shown in FIGS. 2 and 3, each of the clearance lockers 30 comprises a top panel 31 detachably and overlappedly coupled at the top side of each of the supporting arms 11, 12, and a side panel 32 downwardly extended from the top panel 31 to bias against the bed slat 20. In other words, a bottom edge of the side panel 32 is defined as the biasing portion of the clearance locker 30 to downwardly press on the end portion 21 of the bed slat 20. Particularly, when the end portion 21 of the bed slat 20 is pressed by the side panel 31, the interlocking engagement between the supporting arm 11, 12 and the bed slat 20 via the interlocking slot 22 and the engaging slot 13 cannot be released. Therefore, the bed slat 20 will be interlocked with the supporting arm 11, 12 once the clearance locker 30 is coupled thereto. It is worth mentioning that an upper portion of the engaging slot 13 will be covered by the side panel 32 when the clearance locker 30 is coupled at the supporting arm 11, 12.

Preferably, the clearance locker 30 has a L-shaped cross section to define the top panel 31 and the side panel 32, wherein when the top panel 31 is rested on the top side of the supporting arm 11, 12, the side panel 32 is overlapped along the inner side of the supporting arm 11, 12. The side panel 32 has a predetermined length downwardly extended from the top panel 31 to bias against the upper edge of the end portion 21 of the bed slat 20. It is worth mentioning that after the end portion 21 of the bed slat 20 is slidably inserted into the engaging slot 13, the bed slat 20 is slid downwardly to engage the interlocking slot 22 with the bottom edge of the engaging slot 13 so as to interlock the bed slat 20 with the supporting arm 11, 12. In order to detach the bed slat 20 from the supporting arm 11, 12, the bed slat 20 must be slid upwardly to disengage the interlocking slot 22 with the bottom edge of the engaging slot 13. The bed slat 20 is unlocked from the supporting arm 11, 12 to allow the end portion 21 of the bed slat 20 being slid out of the engaging slot 13. Therefore, when the clearance locker 30 is coupled at the supporting arm 11, 12 to bias against the end portion 21 of the bed slat 20, the bed slat 20 is prohibited to slide upwardly to disengage the interlocking slot 22 with the bottom edge of the engaging slot 13. As a result, the clearance lockers 30 not only minimize the clearances of the end portions 21 of the bed slats 20 within the engaging slots 13 but also prevent the bed slats 20 being detached from the supporting arms 11, 12.

In one embodiment, each of the bed frame modules 100 further comprises a plurality of first slat locking holes 41 spacedly formed on the top side of each of the supporting arms 11, 12, a plurality of second slat locking holes 42 spacedly formed on the top panel 31 of the clearance locker 30, and a plurality of slat locking elements 43 penetrating through the first and second slat locking holes 41, 42 to detachably couple the top panel 31 on the top side of the supporting arm 11, 12. Accordingly, the first and second slat locking holes 41, 42 are screw holes, wherein the slat locking elements 43 are screws or blots to pass through the first and second slat locking holes 41, 42 to detachably couple the clearance locker 30 at the supporting arm 11, 12. Therefore, when the top panel 31 is rested on the top side of the supporting arm 11, 12, the first slat locking holes 41 are aligned with the second slat locking holes 42 for the slat locking elements 43 passing therethrough.

According to the preferred embodiment, each of the clearance lockers 30 is long enough to bias against two or more end portions 21 of the bed slats 20 at one of the supporting arms 11, 12. In one embodiment, there are six bed slats 20 spacedly extended between the supporting arms 11, 12, wherein two clearance lockers 30 are coupled at the supporting arms 11, 12 to form one of the bed frame module 100. Each of the clearance lockers 30 is coupled at the corresponding supporting arm 11, 12 to bias against the end portions 21 of the six bed slats 20 at each supporting arm 11, 12. Furthermore, there are two first slat locking holes 41 formed at two end portions of the top panel 31 of each of the clearance lockers 30 and there are two second slat locking holes 42 formed at two end portions of the top side of each of the supporting arms 11, 12, such that two slat locking elements 43 are locked at the first and second slat locking holes 41, 42 to ensure the clearance locker 30 biasing against the end portions 21 of the bed slats 20 at the same time. It should be appreciated that the length of the clearance locker 30 can be modified and the numbers of the first and second slat locking holes 41, 42 can be varied. It should also be appreciated that each of the clearance lockers 30 can be formed to have a U-shaped cross section to couple at the supporting arm 11, 12, as long as the end portion 21 of the bed slat 20 can be pressed by the clearance locker 30.

When two or more bed frame modules 100 are provided, the bed frame of the present invention further comprises a module locker 50 that locks up the bed frame modules 100 with each other. The two bed frame modules 100 can be coupled side-by-side at a position that the supporting arms 11, 12 of the bed frame modules 100 are extended side-by-side along each other. Likewise, the two bed frame modules 100 can be coupled end-to-end at a position that the supporting arms 11, 12 of the bed frame modules 100 are extended end-to-end. The module locker 50 is arranged to connect the bed frame modules 100 end-to-end as shown in FIG. 1.

According to the preferred embodiment, the module locker 50 comprises two arm lockers 51, wherein each of the arm lockers 51 locks up two end portions of the supporting arms 11, 12 in an end-to-end manner so as to couple two of the bed frame modules 100 with each other. In other words, the first arm locker 51 is arranged to lock up the first supporting arms 11 of the first bed frame module 100 with the first supporting arms 11 of the second bed frame module 100, while the second arm locker 51 is arranged to lock up the second supporting arm 12 of the first bed frame module 100 with the second supporting arm 12 of the second bed frame module 100.

Figure 4:
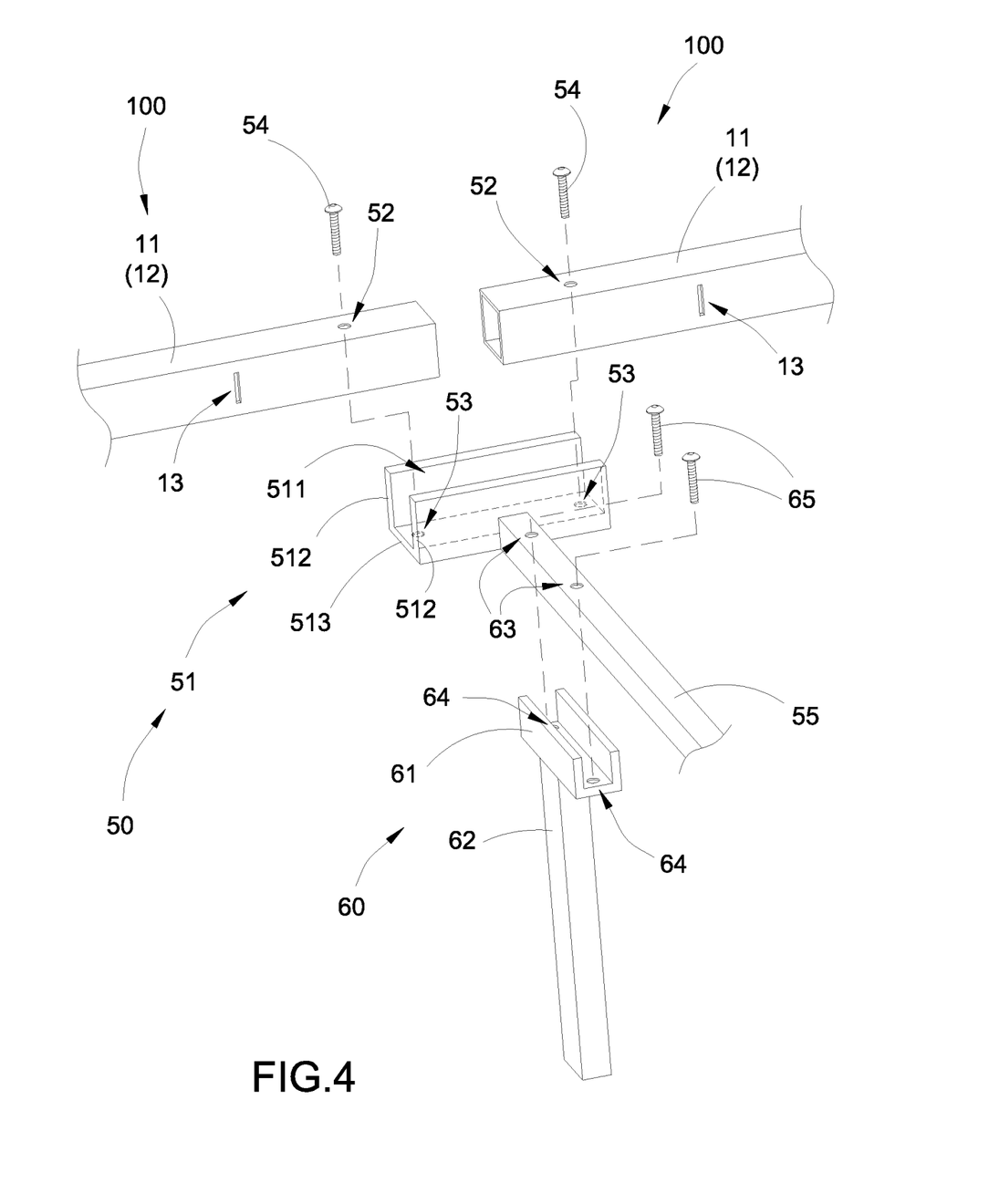
FIG. 4 is a partially perspective view of the disassemble bed frame according to the preferred embodiment of the present invention, illustrating the connection between two bed frame modules.

As shown in FIG. 4, each of the arm lockers 51 is constructed in a U-shaped configuration to have an arm locking cavity 511 that the end portions of the supporting arms 11, 12 of the bed frame modules 100 are received in the arm locking cavity 511 of the arm locker 51. Particularly, each of the arm lockers 51 comprises two side locking panels 512 and a base locking panel 513 extended from bottom edges of the side locking panels 512 to form the U-shaped configuration, wherein the arm locking cavity 511 is defined between the side locking panels 512. A width of the end portion of the supporting arm 11, 12 is slightly smaller than a width of the arm locking cavity 511, i.e. a distance between the side locking panels 512. In addition, a length of the arm locker 51 is long enough to receive two end portions of the supporting arms 11, 12 end-to-end.

In order to lock up the arm locker 51 with two end portions of the supporting arms 11, 12 end-to-end, the module locker 50 further comprises a plurality of first arm locking holes 52 formed at the end portions of the supporting arms 11, 12, a plurality of second arm locking holes 53 spacedly formed at the arm lockers 51, and a plurality of arm locking elements 54 penetrating through the first and second arm locking holes 52, 53 to detachably couple the end portions of the supporting arms 11, 12 at the arm locker 51. In one embodiment, the first and second arm locking holes 52, 53 are screw holes, wherein the arm locking elements 54 are screws or blots to pass through the first and second arm locking holes 52, 53 to lock up the end portions of the supporting arms 11, 12 at the arm locker 51. Accordingly, one first arm locking hole 52 is formed at each end portion of the supporting arm 11, 12, wherein two second arm locking holes 53 are formed at two end portions of the base locking panel 513 of the arm locker 51. Therefore, when the end portions of the supporting arms 11, 12 are received in the arm locking cavity 511 and supported on the base locking panel 513 to align the first arm locking holes 52 with the second arm locking holes 53, the arm locking element 54 are extended through the first and second arm locking holes 52, 53 to lock up the end portions of the supporting arms 11, 12 at the arm locker 51.

For further enhancing the strength of the bed frame, the module locker 50 further comprises a reinforcing member 55 extended between the arm lockers 51, such that when the bed frame modules 100 are coupled with each other via the arm lockers 51, the reinforcing member 55 is extended between the supporting arms 11, 12 of each of the bed frame modules 100. Accordingly, the reinforcing member 55 is extended between the bed frame modules 100 to parallel with the bed slats 20. In other words, the bed slats 20 are extended between the supporting arms 11, 12 of each of the bed frame modules 100 while the reinforcing member 55 is extended between two bed frame modules 100. The reinforcing member 55 not only reinforces the strength between two the bed frame modules 100 but also evenly distributes the loading forces between two the bed frame modules 100.

The disassemble bed frame further comprises a reinforcing leg frame 60 to support the bed frame modules 100. The reinforcing leg frame 60 comprises a leg connector 61 detachably coupled at the reinforcing member 55 and a leg supporter 62 downwardly extended from the leg connector 61 to support the bed frame modules 100. As shown in FIG. 4, the leg connector 61 is constructed to have a U-shaped configuration, wherein the reinforcing member 55 is rested on the leg connector 61. The leg supporter 62 is integrally extended from the leg connector 61 to support on the ground surface.

Accordingly, the reinforcing leg frame 60 further comprises one or more first leg locking holes 63 formed at the reinforcing member 55, one or more second leg locking holes 64 formed at the leg connector 61, and one or more leg locking elements 65 penetrating through the first and second leg locking holes 63, 64 to lock up the leg connector 61 t the reinforcing member 55. In other words, when the reinforcing member 55 is rested on the leg connector 61, the first leg locking holes 63 are aligned with the second leg locking holes 64 for the leg locking members extending therethrough.

As shown in FIG. 1, the disassemble bed frame further comprises two end frames 71, 72. One of the end frames 71 is embodied as a head board while another end frames 72 is embodied as an end board. The two end frames 71, 72 are detachably coupled at the end portions of the supporting arms 11, 12. In one embodiment, the head board is detachably coupled at the supporting arms 11, 12 of one of the bed frame modules 100 while the end board is detachably coupled at the supporting arms 11, 12 of another bed frame module 100. The bed slats 20 and the reinforcing member 55 are located between the end frames 71, 72. It is worth mentioning that the end frames 71, 72 also serve as two leg frames, i.e. front and rear leg frames, to support the bed frame modules 100. In other words, three sets of legs, including the end frames 71, 72, and the reinforcing leg frame 60, are provided to support the bed frame modules 100.

All the components, including the supporting arms 11, 12, the bed slats 20, the clearance lockers 30, the module lockers 50, and the reinforcing leg frame 60, are individual components being packed into a compact unit. The largest size of the individual component of the disassemble bed frame is the end frame 71.

The assembling operation of the disassemble bed frame of the present invention comprises the following steps.

(1) Spacedly couple the bed slats 20 between the supporting arms 11, 12 by receiving two end portions 21 of each of the bed slats 20 at two engaging slots 13 at the supporting arms 11, 12 respectively. In the step (1), after the end portion 21 of the bed slat 20 is slidably inserted into the engaging slot 13 of the supporting arm 11, 12, the bed slat 20 is moved downwardly to engage the interlocking slot 22 with the bottom edge of the engaging slot 13 so as to interlock the bed slat 20 with the supporting arm 11, 12. Therefore, the bed slats 20 are spacedly extended between the supporting arms 11, 12.

(2) Detachably couple the clearance lockers 30 at the supporting arms 11, 12 to form the bed frame module 100, wherein the clearance lockers 30 are arranged to bias against the end portions 21 of the bed slats 20 to minimize the clearances of the end portions 21 of the bed slats 20 within the engaging slots 13 and to prevent the bed slats 20 being detached from the supporting arms 11, 12.

In the step (2), the top panel 31 of the clearance locker 30 is detachably coupled at the top side of the supporting arm 11, 12, wherein the side panel 32 is extended to bias against the end portion 21 of the bed slat 20. Therefore, the end portion 21 of the bed slat 20 is pressed to minimize the clearance between the end portion 21 of the bed slat 20 and the engaging slot 13. In addition, the end portion 21 of the bed slat 20 is locked at the supporting arm 11, 12.

(3) Detachably couple two end frames 71, 72 at two ends of the bed frame module 100.

When two bed frame modules 100 are required, the method further comprises a step of detachably coupling two bed frame modules 100 via the module locker 50. Particularly, the bed frame modules 100 are connected with each other end-to-end via the module locker 50. In the step (3), the two end frames 71, 72 are detachably coupled at two ends of the bed frame modules 100.

The disassembling operation of the disassemble bed frame is simple by detaching the detaching the clearance lockers 30 from the supporting arms 11, 12, uplifting the end portion 21 of the bed slat 20 to disengage the interlocking slot 22 with the bottom edge of the engaging slot 13, and slidably disengaging the end portion 21 of the bed slat 20 with the engaging slot 13 to detach the bed slat 20 from the supporting arm 11, 12.

It is worth mentioning that the assembling and disassembling of the disassemble bed frame can be repeatedly operated without weakening the structure of the disassemble bed frame because the clearance between the end portion 21 of the bed slat 20 and the engaging slot 13 can be minimized via the clearance locker 30 to secure the connection between the bed slats 20 and the supporting arms 11, 12. Furthermore, the configuration of the bed frame module 100 can be incorporated with other furniture frames, such as a frame of a sofa, bunk bed frame, or even a table frame. In other words, the bed frame module 100 not only serves as a basic bed structure but also used as different furniture frames to have the re-assembling ability, the rigid supportability, and the expandability.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A disassemble bed frame, comprising one or more bed frame modules, wherein each of said bed frame modules comprises:

two longitudinal supporting arms, wherein each of said supporting arms has a hollow structure, wherein each of said supporting arms has a plurality of engaging slots spacedly formed at an inner side thereof, such that said engaging slots along said supporting arms are aligned when said supporting arms are extended parallelly;

a plurality of bed slats, wherein two end portions of each of said bed slats are slidably inserted into said supporting arms through said engaging slots and received at two of said engaging slots of said supporting arms respectively, such that said bed slats are spacedly extended between said supporting arms, wherein each of said bed slats further has an interlocking slot upwardly extended from a bottom edge of said end portion of said bed slat as a vertical slot defining an opening at said bottom edge of said end portion of said bed slat, wherein once said end portion of said bed slat is slidably inserted into said supporting arm through said engaging slot, said bed slat is slid downwardly to interlock with a bottom edge of said engaging slot; and a plurality of clearance lockers, wherein said clearance lockers are detachably coupled at said supporting arms to partially cover said engaging slots and are biased against said end portions of said bed slats to minimize clearances between said end portions of said bed slats and said engaging slots and to prevent said bed slats being detached from said supporting arms, wherein each of said clearance lockers comprises a top panel detachably and overlappedly coupled at a top side of each of said supporting arms, and a side panel downwardly extended from said top panel, wherein said side panel is overlapped along said inner side of said supporting arms to cover an upper portion of said engaging slot and to bias against said end portions of said bed slat so as to tighten said end portions of said bed slats at said engaging slots and to prevent said bed slat being slid upwardly to disengage said interlocking slot with said engaging slot.

2. The disassemble bed frame, as recited in claim 1, wherein each of said clearance lockers has a biasing portion defined at a bottom edge of said side panel and downwardly pressed on said end portion of said bed slat to tighten said end portion of said bed slat at said engaging slot and to only cover an upper portion of said engaging slot.

3. The disassemble bed frame, as recited in claim 1, wherein each of said bed frame modules further comprises a plurality of first slat locking holes spacedly formed on said top side of each of said supporting arms, a plurality of second slat locking holes spacedly formed on said top panel of said clearance locker, and a plurality of slat locking elements penetrating through said first and second slat locking holes to detachably couple said top panel on said top side of said supporting arm.

4. The disassemble bed frame, as recited in claim 1, wherein each of said engaging slots has an elongated configuration vertically formed at said inner side of each of said supporting arms, wherein said end portion of each of said bed slats is flatten to form a vertical flatten end so as to slidably insert into said engaging slot, wherein a length of each of said engaging slots is smaller than a height of each of said supporting arms.

5. The disassemble bed frame, as recited in claim 4, wherein said clearance locker has a L-shaped cross section to define said top panel and said side panel integrally extended therefrom.

6. The disassemble bed frame, as recited in claim 5, wherein each of said clearance lockers is coupled at said supporting arm to bias against an upper edge of end portion of said bed slat to minimize said clearances of said end portion of said bed slats within said engaging slots and to prevent said end portions of said bed slats from disengaging with said engaging slots so as to prevent said bed slat being detached from said supporting arm.

7. The disassemble bed frame, as recited in claim 1, wherein said engaging slots are vertically, parallelly and spacedly formed at said inner side of each of said supporting arms and are further extended to said top side of each of said supporting arms, such that each of said engaging slots is formed at a L-shaped configuration.

8. The disassemble bed frame, as recited in claim 1, further comprising a module locker that locks up said bed frame modules with each other, wherein said module locker comprises two arm lockers that each of said arm lockers locks up two end portions of said supporting arms in an end-to-end manner so as to couple two of said bed frame modules with each other.

9. The disassemble bed frame, as recited in claim 8, wherein each of said arm lockers is constructed in a U-shaped configuration to have an arm locking cavity that said end portions of said supporting arms of said bed frame modules are received in said arm locking cavity of said arm locker.

10. The disassemble bed frame, as recited in claim 8, wherein said module locker further comprises a plurality of first arm locking holes formed at said end portions of said supporting arms, a plurality of second arm locking holes spacedly formed at said arm lockers, and a plurality of arm locking elements penetrating through said first and second arm locking holes to detachably couple said end portions of said supporting arms at said arm locker.

11. The disassemble bed frame, as recited in claim 8, wherein said module locker further comprises a reinforcing member extended between said arm lockers and parallel with said bed slats, such that when said bed frame modules are coupled with each other via said arm lockers, said reinforcing member is extended between said supporting arms of each of said bed frame modules.

12. The disassemble bed frame, as recited in claim 11, further comprising a reinforcing leg frame which comprises a leg connector detachably coupled at said reinforcing member and a leg supporter downwardly and integrally extended from said leg connector to support said bed frame modules, wherein said leg connector has a U-shaped configuration that said reinforcing member is rested on said leg connector.

* * * * *